United States Patent [19]

Honerkamp et al.

[11] 4,375,977
[45] Mar. 8, 1983

[54] SYSTEM OF GAS DEHYDRATION USING LIQUID DESICCANTS

[75] Inventors: Joseph D. Honerkamp; Harold O. Ebeling, both of Tulsa, Okla.

[73] Assignee: Latoka Engineering, Inc., Tulsa, Okla.

[21] Appl. No.: 227,998

[22] Filed: Jan. 23, 1981

[51] Int. Cl.³ .............................................. B01D 53/20
[52] U.S. Cl. ....................................... 55/234; 55/256; 261/114 A
[58] Field of Search ........................... 55/29–32, 55/48, 89, 90, 95, 185, 208, 227, 234, 255, 256; 261/114 A, 123

[56] References Cited

U.S. PATENT DOCUMENTS

| | | | |
|---|---|---|---|
| 1,423,696 | 7/1922 | Stevens | 55/227 X |
| 1,865,818 | 7/1932 | Berryman | 261/114 A X |
| 2,070,578 | 2/1937 | Bowman | 55/256 X |
| 2,491,209 | 12/1949 | Rapisarda et al. | 261/114 A |
| 3,097,917 | 7/1963 | Dotts, Jr. et al. | 55/48 |
| 3,634,998 | 1/1972 | Patterson | 55/32 |
| 3,733,782 | 5/1973 | Hatchel | 55/227 X |
| 3,768,234 | 10/1973 | Hardison | 55/227 X |
| 3,780,499 | 12/1973 | Dorr et al. | 55/32 |
| 4,055,403 | 10/1977 | Strauss | 55/31 |

FOREIGN PATENT DOCUMENTS

| | | | |
|---|---|---|---|
| 523517 | 4/1931 | Fed. Rep. of Germany | 55/29 |
| 312457 | 5/1929 | United Kingdom | 55/29 |

*Primary Examiner*—Robert H. Spitzer
*Attorney, Agent, or Firm*—Head, Johnson & Stevenson

[57] ABSTRACT

A method of dehydrating wet gas including the steps of passing the wet gas downwardly through a vertical conduit, injecting anhydrous glycol into the vertical gas stream to intermix with the wet gas, passing the gas and glycol mixture downwardly within a vessel into a pool of glycol, the gas passing upwardly through the pool and into a gas collection chamber, the water entrained in the gas being absorbed by the glycol, the dry gas being passed out of the vessel, the glycol having water admixed therewith being conveyed to a water extraction means to provide a supply of anhydrous glycol and circulating the anhydrous glycol back to the vertical gas stream. The invention also encompasses a separator for extracting entrained water from a gas stream and including means for injecting the gas stream into a vertical conduit where it is mixed with glycol. The invention also includes an absorber wherein the gas stream is passed upwardly through a pool of glycol.

5 Claims, 7 Drawing Figures

SYSTEM OF GAS DEHYDRATION USING LIQUID DESICCANTS

BACKGROUND OF THE INVENTION

1. Field of the Invention

This disclosure relates to a method, and apparatus for practicing the method of extracting water from wet gas to provide, at the outlet, a flow of gas substantially free of water. The invention is particularly applicable to the processing of natural gas in which the gas has entrained in it water of sufficient quantity to make its further transportation and storage difficult and includes means of extracting the water from the gas at a point adjacent the area where the gas is collected to provide, at the outlet, gas substantially free of water so that it may be more economically and efficiently transported, stored, processed, and used.

The field of the invention is particularly concerned with a well-known method for extracting water from gas known as "glycol dehydration" or "liquid desiccant dehydration" in which the wet gas is mixed and/or contacted with glycol or some other liquid desiccant, the glycol absorbing water from the gas, the glycol then being heated to evaporate the water from it, and the anhydrous glycol being recirculated for adsorption and/or admixture with wet gas, in a continuous process. The invention improves the known techniques of glycol dehydration by providing a method in which the gas is more intimately contacted with the glycol for more improved extraction of water from the gas and includes improved apparatus wherein effective water extraction can be achieved with vessels of reduced height and better economy of construction.

2. Description of the Prior Art

The invention, as above mentioned, is concerned with extracting water from wet gas and is particularly applicable for utilization in the petroleum processing industry wherein natural gas commonly has entrained in it a quantity of water. If the water remains in the gas as it is transported, stored and used, it is a source of many problems. The water entrained in the gas easily freezes and thereby can plug pipelines, valves, orifices, etc. In addition, the water constitutes a non-combustible portion of natural gas as it emanates from production sources, and the handling and transportation of this portion of the naturally occurring gas stream is uneconomical and inefficient. For these and many other reasons, it is highly desirable that as much water as possible be extracted from natural gas after it flows from gas production sources, and the extraction process is preferably carried out in the vicinity of the source where the gas is produced. In this way the gas can be processed to remove excess water before it is conveyed to transmission lines or further processing.

There are a variety of ways for separating water from gas, but the method most commonly employed in the petroleum industry is the use of glycol or other liquid desiccant dehydrators. Glycol readily mixes with water and has a lower vapor pressure than water. Thus, it is well known to pass wet gas into contact with glycol wherein the water in the gas is absorbed by the glycol. The gas is then passed in an upward column wherein the glycol/water mixture physically separates from the gas stream. The glycol/water mixture is then heated to drive off the water, the dry or anhydrous glycol then being recirculated to contact wet gas in a continuous process so that water is extracted from a gas stream.

A difficulty associated with most glycol dehydrators is that in order to achieve sufficient contact of wet gas and glycol, it has been necessary to construct vessels of relatively tall vertical height. The typical absorber vessel includes a plurality of vertical trays with a series of bubble caps in each tray. Glycol is maintained on each tray at a shallow depth, the gas passing through the bubble caps where it contacts the glycol. A certain minimum spacing is required between the bubble trays in order to allow entrained droplets of glycol carried by the upwardly moving gas stream to fall downwardly. It is apparent that constructing vessels of high vertical height is relatively expensive; and in addition, such construction requires that the vessels be transported to the site in a horizontal position and subsequently erected in place. With the current commonly practiced techniques of glycol dehydration, it is not practical to fabricate a complete gas dehydration system in a factory and transport it for direct installation in the field because of the vertical height requirements.

The present invention provides a means of utilizing glycol gas dehydration in a manner which provides improved effectiveness and efficiency in contacting wet gas with glycol and in a manner which does not require tall vertical vessels having a plurality of bubble trays. The present invention provides improved means of glycol dehydration utilizing shorter height vessels and in an arrangement wherein the percentage of entrained water removed from wet gas is significantly improved.

SUMMARY OF THE INVENTION

A method of dehydrating wet gas is provided including improved separator and absorber vessels for practicing the invention. The method includes passing wet gas downwardly through a vertical conduit. Anhydrous glycol is injected into the vertical moving gas stream in the conduit to intermix with the wet gas. The gas and glycol mixture is then passed downwardly into a pool of glycol, the gas being moved upwardly through a bubble cap tray packing system flooded with glycol and into an upper gas collection chamber. In the collection chamber entrained droplets of glycol fall out, leaving in the upper portion of the collection chamber dry gas which is withdrawn from the vessel. The glycol within the vessel having liquid absorbed in it is circulated to a glycol regeneration facility wherein liquid entrained in the glycol is removed, providing anhydrous glycol. The anhydrous glycol is circulated back to the vertical gas stream providing a continuous process by which liquid is removed from the gas stream.

The invention includes the provision of an improved separator formed of an upright vessel having a gas inlet, a gas outlet, a glycol inlet, and a liquid outlet. A vertical mixing conduit is positioned within the upper interior portion of the separator vessel, the lower end of the conduit being connected to the vessel gas outlet and the upper end being open so that gas within the vessel may pass into it. A glycol injection nozzle is positioned in the upper end of the mixing conduit, with the nozzle being connected to the vessel glycol inlet. Gas from within the vessel flows downwardly within the conduit, and glycol is injected through the nozzle to mix glycol and gas which flows out of the vessel. Means is provided within the lower end of the vessel for the collection of liquid. Gas passes into the vessel at the gas inlet. Within the vessel any entrained droplets of liquid fall out of the gas as the gas moves upwardly within the vessel, the liquid being withdrawn, and the gas passing into the upper end of the vertical mixing conduit.

The invention provides an improved absorber for contacting gas having water entrained therein with glycol. The absorber is in the form of an upright vessel including a horizontal plate which separates the vessel interior into an upper and a lower chamber. A vertical gas conduit within the vessel is connected at its top to a gas inlet in the vessel and passes downwardly through an opening in the horizontal plate into the vessel lower chamber. The horizontal plate has a plurality of openings, each of which has affixed to it a short length vertical cylindrical member, the lower end of each of the cylindrical members extending slightly below the plate and the upper end extending above the plate. A cap covers the upper portion of each of the cylindrical members, the cap having passageways therein below the upper ends of the cylindrical members. Gas passes upwardly through the cylindrical members and under the caps and out the openings therein. A pool of glycol is maintained in the lower chamber and in the lower portion of the upper chamber. Packing is installed in the lower portion of the upper chamber. Gas passes through the packing into a free area within the upper chamber above the packing wherein entrained droplets of glycol are free to fall out. The dry gas, having the liquid originally entrained in it absorbed by the glycol, passes out the top of the vessel. The glycol is then recirculated through a regenerator. The combination of the improved separator and improved absorber vessels, used in the method of the invention, provides a superior means of extracting water from a gas stream.

DESCRIPTION OF THE PREFERRED EMBODIMENT

Figure 1:
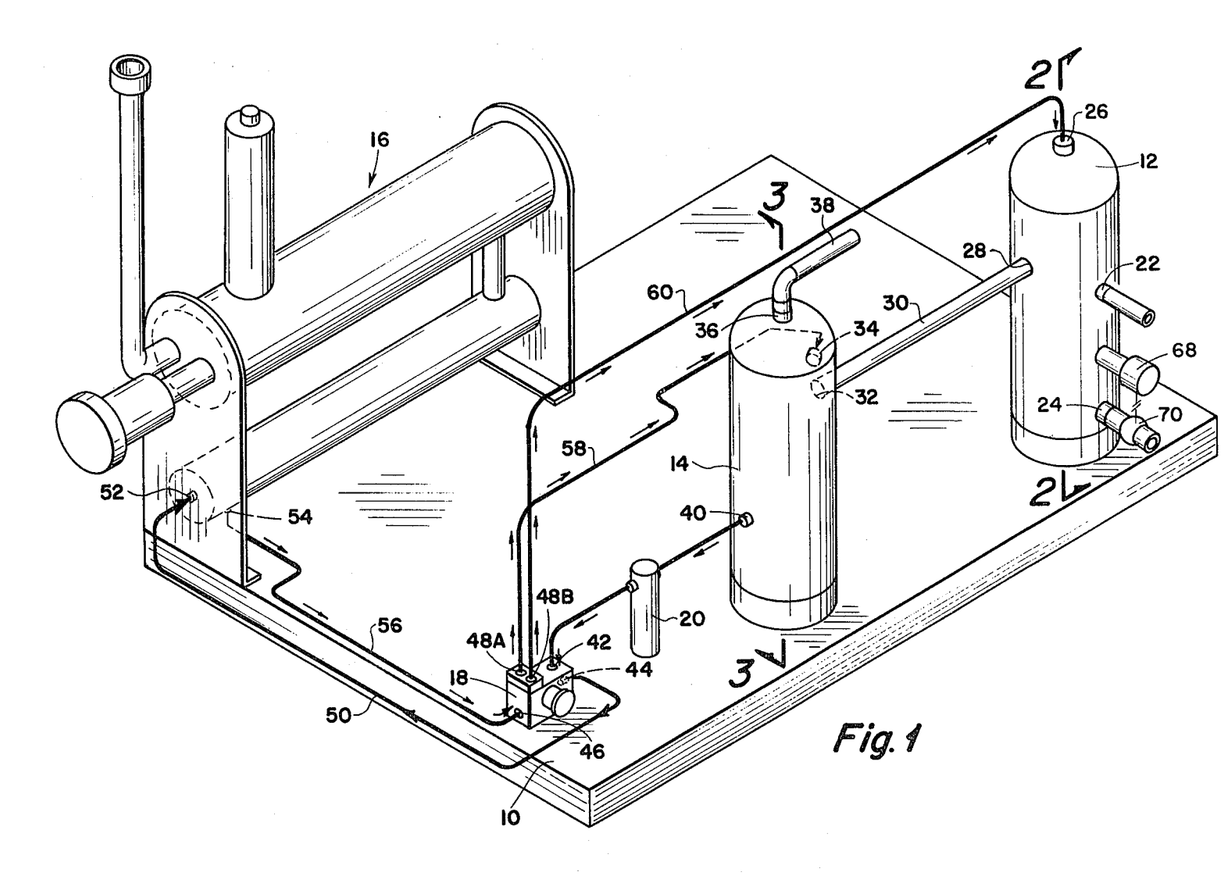
FIG. 1 is an isometric view of a glycol dehydration unit which employs the invention.

Referring now to the drawings and first to FIG. 1, one embodiment which may be employed in practicing the invention is illustrated. The apparatus necessary to implement the method of the invention is shown mounted on a base 10 which, for simplicity purposes, is shown as a solid base although it may be in the form of a fabricated base of metal structural members of the type commonly employed in skid mounting equipment utilized in the petroleum industry. Mounted on the base 10 is a vertical separator vessel 12, a vertical absorber vessel 14, a glycol regenerator generally indicated by the numeral 16, a glycol pump 18, and a glycol filter 20. The gas dehydrator assembly of FIG. 1 is particularly adaptable for mounting in a field or processing plant wherein gas is treated to remove excess liquid therefrom before the gas is conveyed to a pipeline for subsequent transportation, storage or processing.

The gas from a well or wells flows into separator vessel 12 through a gas inlet 22. Within vessel 12, as will be described in greater detail subsequently, the wet gas is handled in such a manner as to allow liquid entrained therein to fall out and to be thereby separated from the gas to the extent possible which can be accomplished physically, that is, by allowing gravity to extract from the flowing gas stream. Liquid is collected in the bottom of vessel 12 and is drawn out through liquid outlet 24. Within the separator 12 the gas stream is mixed with a stream of anhydrous glycol which passes into the vessel 12 through glycol inlet 26. The mixed gas and glycol pass out of vessel 12 through gas outlet 28 and by way of pipe 30 to the gas inlet 32 of absorber 14. Additional glycol is injected into absorber 14 through glycol inlet 34. Within the absorber the gas is more thoroughly and completely mixed with glycol, after which the gas is passed upwardly within the vessel (all of which will be described in more detail), with the dry gas passing out through outlet 36. Thus, wet gas is conveyed into the separator vessel 12 at gas inlet 22 and dry gas passes out of the absorber from outlet 36 where it may be conveyed by pipe 38 to a pipeline, process plant, compressor or other facilities wherein the gas is transported, stored, and utilized.

Glycol circulated out of absorber 14 from glycol outlet 40 passes through the filter 22 into the glycol pump 18. The pump 18 is a dual channel pump, that is, it has an inlet 42 and an outlet 44 providing one stream within the pump. In addition, it has another inlet 46 and a pair of outlets 48A and 48B providing a second stream within the pump. The glycol streams are not co-mingled within the pump, and it can be seen that other types of pumps and flow splitting arrangements can be used.

The glycol passing from absorber 14 through filter 20 and into pump inlet 42 is moved by the pump through outlet 44 and by way of pipe 50 to the inlet 52 of glycol regenerator 16. Within the regenerator the glycol having water absorbed therein is subjected to heat, normally supplied by natural gas available from the field, or by other energy source, so that the water in the glycol is driven off, producing anhydrous glycol. The details of construction and operation of the glycol regenerator 16 are not part of this invention since such are commonly known and practiced in the petroleum industry. Glycol, having had the liquid removed therefrom, passes out of the regenerator outlet 54 as substantially water-free, or anhydrous glycol. It flows by pipe 56 to the pump inlet 46. The pump moves the glycol stream from outlet 48A by way of pipe 58 to the absorber glycol inlet 34. Simultaneously, it moves a stream of glycol from outlet 48B through pipe 60 to the glycol inlet 26 of separator vessel 12.

Figure 4:
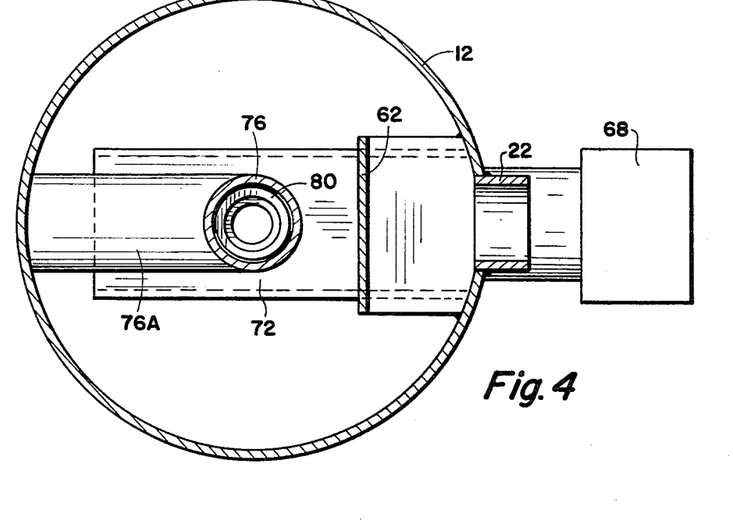
FIG. 4 is a cross-sectional view of the separator vessel taken along the line 4—4 of FIG. 2.

The apparatus for dehydrating gases illustrated in FIG. 1 will typically include other standard pieces of equipment such as heat exchangers, where necessary, and such are not illustrated herein since they are well known in the industry. The essence of the invention is the method of dehydrating gas which is accomplished by the use of separator 12 and absorber 14 which will now be described in detail, reference first being had to FIGS. 2, 4 and 5 which illustrate a preferred embodiment of the separator. Gas flows into vessel 12 at inlet 22. Interiorly of the vessel is a cover 62 which causes the gas stream to divert and flow more evenly into the interior of the vessel (See FIG. 5). Within the vessel the gas stream moves upwardly as indicated by the arrows. The increased diameter of the vessel provides a quiescent zone wherein entrained droplets of liquid can fall out of the moving gas stream by the effect of gravity. Liquid falling out of the entrained gas falls downwardly into the lower portion of the vessel and is collected and maintained at a liquid level 64. The liquid level 64 is detected by a float 66 which operates a control 68 connected to a valve 70 which in turn is connected to the vessel liquid outlet 24. The function of float 66, control 68, and valve 70 is to maintain the liquid level within a preselected range and to discharge liquid as it accumulates. The details of operation of control 68 and valve 70 are well known in industry and for that purpose are not set forth herein.

Figure 5:
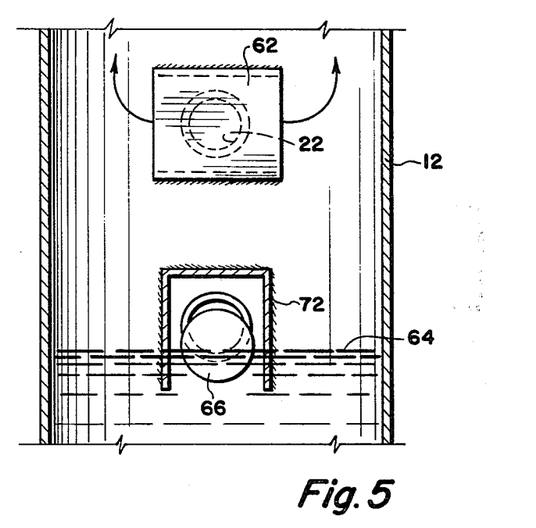
FIG. 5 is a partial vertical cross-sectional view taken along the line 5—5 of FIG. 2 showing some of the details of the internal construction of the separator vessel.

As shown in FIG. 5, a cover 72 is provided within the vessel to protect the float 66 from the effect of flowing gas stream and liquid droplets falling downwardly from the stream.

Figure 2:
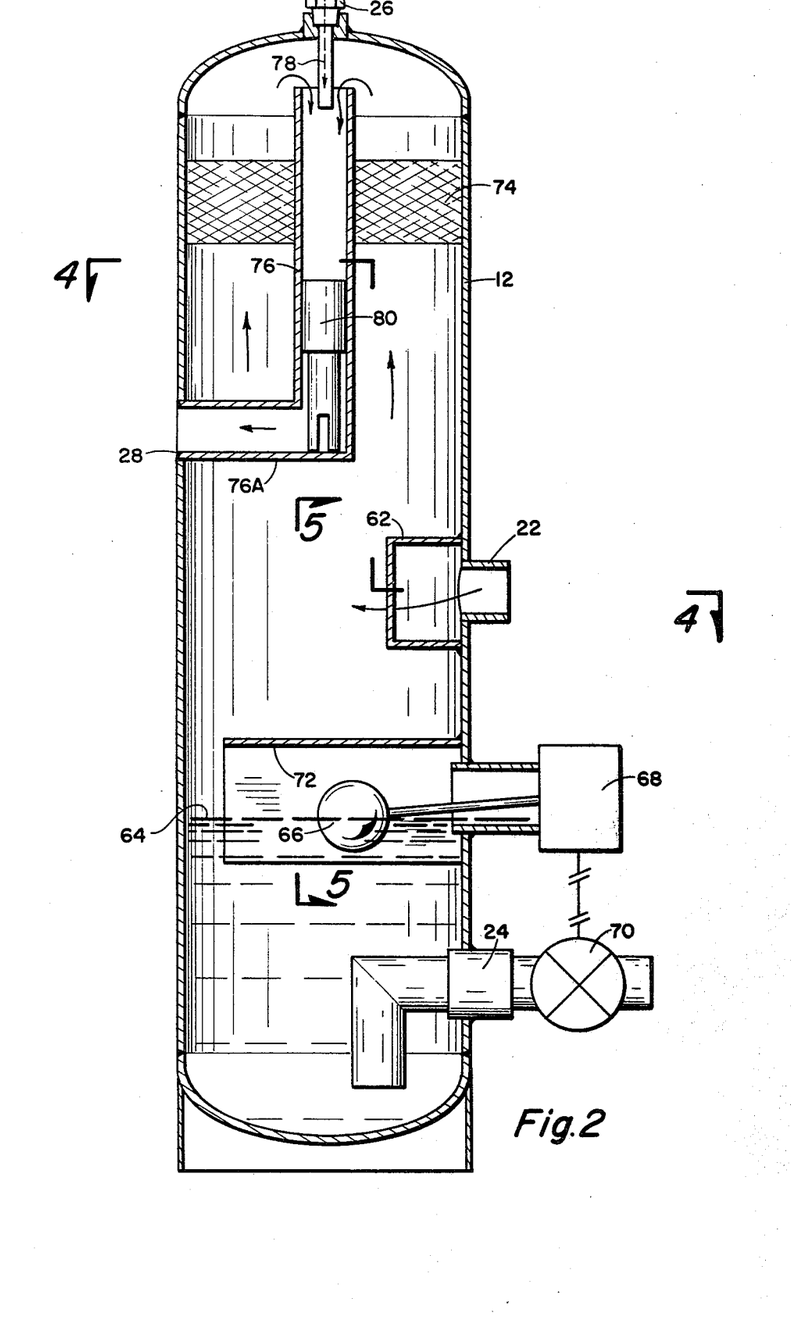
FIG. 2 is a cross-sectional view of the separator vessel as used in the invention, taken along the line 2—2 of FIG. 1.

As the gas stream moves upwardly within the vessel, it passes through a mist extractor 74 which is in the form of filter material providing a large amount of surface area. Small liquid droplets accumulate on the mist extractor, and as they form into larger droplets, fall downwardly. The function of the mist extractor 74 is to help increase the gravitational separation of entrained liquid from the gas stream.

Positioned within the interior of vessel 12 is a vertical mixing conduit 76 which has, at the lower end, a horizontal portion 76A which connects with the gas outlet 28. Extending from the upper end of the vessel is a glycol injection nozzle 78 connected to the vessel glycol inlet 26. The exterior diameter of nozzle 78 is less than the interior diameter of mixing conduit 76, providing an annular area therebetween through which gas flows into the conduit from the interior of the vessel. As the gas and glycol flow downwardly within the mixing conduit 76, they are co-mingled and mixed so that liquid entrained within the gas is absorbed by the glycol. To augment the mixing of the glycol and gas in conduit 76 an auxiliary mixing element 80 may be employed. The mixing element 80 may take a variety of forms, an example being a commercially available Koch mixer. The function of element 80 is merely to more thoroughly co-mingle the downwardly flowing gas and glycol streams which pass out of the separator 12 through outlet 28.

Figure 3:
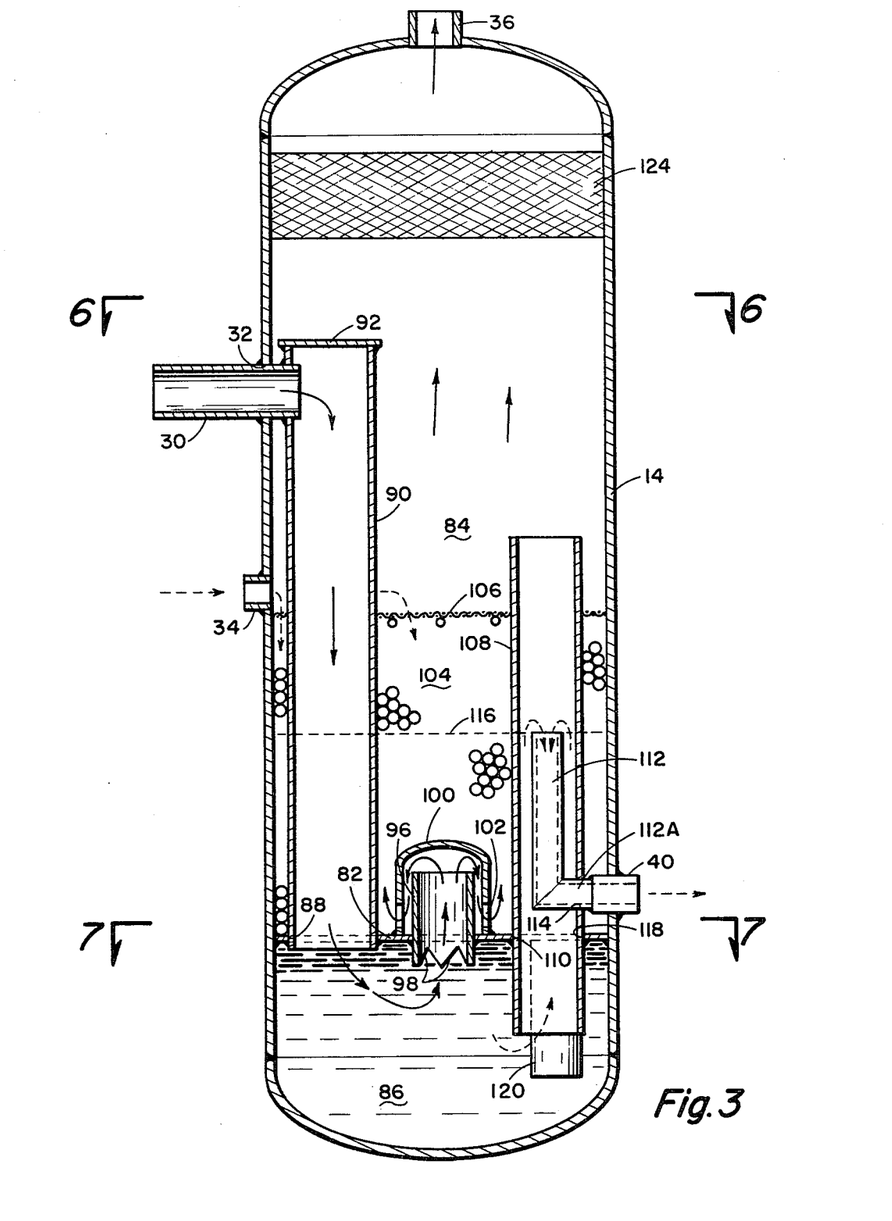
FIG. 3 is a cross-sectional view of the absorber vessel as used in the invention as taken along the line 3—3 of FIG. 1.
Figure 6:
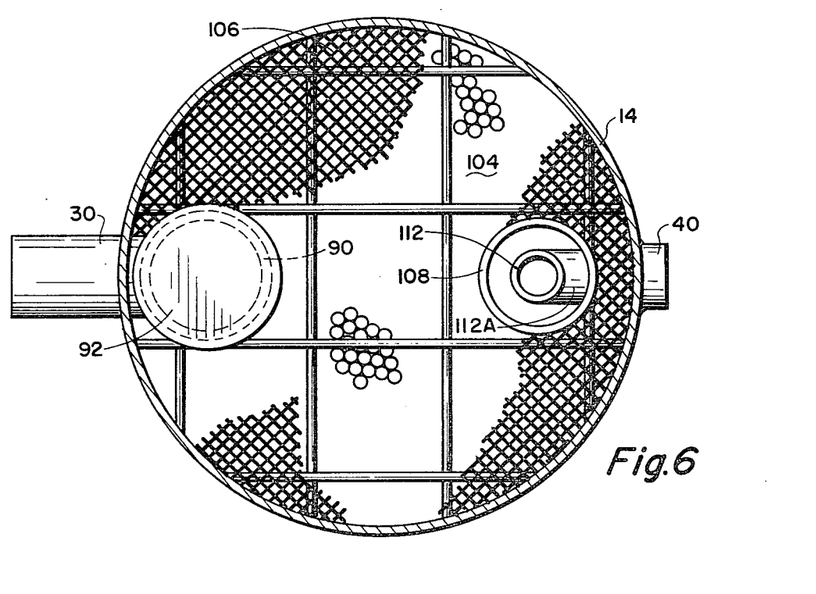
FIG. 6 is a cross-sectional view taken along the line 6—6 of FIG. 3 showing details of the internal construction of the absorber vessel.
Figure 7:
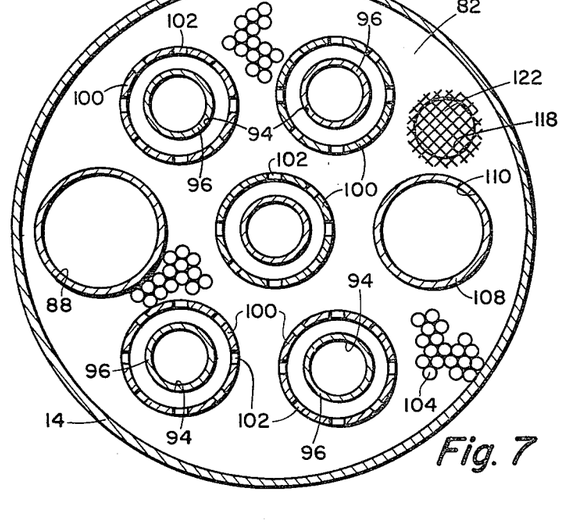
FIG. 7 is another cross-sectional view of the absorber vessel taken along the line 7—7 of FIG. 3 and showing the details of construction of the cylindrical members and caps as employed in the invention.

Turning now to FIGS. 3, 6, and 7, the details of construction of the absorber will be described. Within the absorber vessel 14 is a horizontal plate 82 which divides the vessel into an upper chamber 84 and a lower chamber 86. The plate 82 has a first opening 88 therein. Vertically received within the interior of the vessel and in opening 82 is a vertical gas conduit 90 which is closed at its top end 92. Pipe 30 passes through the gas inlet 32 and connects with the interior of the gas conduit 90 so that gas flowing into vessel 14 passes downwardly through conduit 90 and through opening 88 in the plate and is discharged in the lower chamber 86.

Plate 82 has a plurality of additional smaller diameter openings (five being shown in FIG. 7), each of which receives a short length vertical cylindrical member 96. The lower end of each of the cylindrical members 96 extends below the plate 82 and preferably is configured, as shown, wherein the lower end is defined by a series of notches 98. Welded to the upper surface of plate 82 over each of the cylindrical members 96 is a cap 100. The interior diameter of each of the caps 100 is greater than the exterior diameter of the cylindrical members 96, and the caps have, adjacent their lower edge, a series of passageways 102, the passageways being below the upper ends of the cylindrical members 96.

Filling the lower portion of the vessel upper chamber 84 is a layer of packing 104, the packing surrounding the caps 100. Packing 104 may include pull rings, saddles, ceramic bulls, or any other type of a wide variety of materials commonly employed for such purpose. To retain the thick layer of packing 104 in position, a screen 106 is secured within the interior of the vessel. The function of packing 64, which may take a variety of forms, is to provide a large surface area so that gas passing upwardly through the packing thoroughly contacts glycol so that substantially all of the liquid content of the gas is absorbed by the glycol.

A vertical glycol discharge conduit 108 is received in an opening 110 in plate 82. The glycol discharge conduit extends from near the bottom of the vessel within the lower chamber 86 into the vessel upper portion 84 above screen 106 and is open at each end. Centrally positioned within the glycol discharge conduit 108 is a glycol outlet conduit 112 which has a horizontal portion 112A extending through an opening 114 in the sidewall of conduit 108. The glycol outlet conduit horizontal portion 112A communicates with the vessel glycol outlet 40. The open upper end of the glycol outlet conduit 112 establishes the height of glycol within the vessel, the level of the glycol being indicated by the numeral 116.

An opening 118 in plate 82 receives a downwardly extending glycol equalization conduit 120, the lower end of which is adjacent the vessel bottom and below the lower end of glycol discharge conduit 108. A screen 122 is placed over the top of the conduit 120 (See FIG. 7) so as to retain packing 104 in position above plate 82.

Positioned in the upper end of the vessel 14 is mist extracting packing 124 which serves essentially the same purpose as the packing 74 in vessel 12; that is, it intercepts any small droplets of liquid carried upwardly by the gas stream. In vessel 112 the mist extractor is intended to intercept liquid droplets whereas in vessel 14 the mist extractor 124 intercepts droplets of glycol. As the droplets accumulate in size, they eventually fall downwardly from the mist extractor and onto screen 106 where they pass downwardly into the packing. The gas which is essentially dry, having all the water therein absorbed by glycol, passes out the top of vessel 14 through gas outlet 36.

The method of operation of the absorber vessel 14 will now be described. Gas and glycol flow through pipe 30 into the interior of gas conduit 90 and downwardly into the vessel lower chamber 86. All of the interior of the vessel 14 below the glycol level 116 is filled with liquid glycol, except where displaced by gas. Gas flowing into the lower chamber 86 passes through notches 98 on the lower end of the plurality of cylindrical members 96. The gas flows upwardly through the cylindrical members and downwardly in the annular area between the exterior of the cylindrical members and the interior of caps 100, and then out through the openings 102 in the caps. Thus the gas thoroughly contacts the pool of glycol in the lower chamber 86. As the gas flows out of outlets 102 in the caps 100, it flows upwardly through the packing 104 in the vessel above the plate 82. The lower portion of the packing below the glycol level 116 is fully immersed in glycol. The portion of packing 104 above the level 116 is not immersed in glycol but is wetted by glycol carried upwardly by the gas stream and by glycol deposited onto the screen from glycol inlet 34. The gas stream emerges through screen 106 into the upper portion of the vessel below the mist extractor 124. As the gas moves upwardly in this large area, it moves at a relatively low rate permitting any entrained droplets of glycol to fall out of the gas column and back onto screen 106 and into the packing. To ensure a continuous supply of anhydrous glycol, a supplementary glycol flow is provided through inlet 34. Thus, glycol enters the absorber vessel 14 in two ways; that is, intermixed with gas as it flows through inlet 32 and the supplementary flow through glycol inlet 34. Glycol flows downwardly through the packing 104 against the direction of the flow of gas as it moves upwardly through conduit 120 through the packing. The glycol passes downwardly to lower chambers through conduit 120 into the interior of glycol discharge conduit 108 in the lower end thereof and rises upwardly therein into the upper end of the glycol outlet conduit 112 where it flows into the conduit and out through glycol outlet 40.

The combination of the separator 12 and absorber 14 provides an arrangement wherein wet gas is more effectively and efficiently treated for removal of entrained water without requiring the high vertical height of commonly employed dehydrator systems.

The invention has been described using glycol as the liquid desiccant for extracting water from gas. It is understood that this is by way of example, and the term "glycol" is intended to encompass any liquid desiccant which may be used in the manner described herein for absorbing water entrained in gas. The methods and apparatus of this invention may be used to extract components other than water from gas using liquid reagents other than glycol.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A separator for extracting liquid from gas comprising:
    an upright vessel having a gas inlet, a gas outlet, a liquid desiccant inlet and a liquid outlet;
    a vertical mixing conduit positioned within the upper interior portion of said separator vessel, the upper end of the mixing conduit being open and the lower end being connected to said vessel gas outlet;
    a liquid desiccant injection nozzle having the outlet end within the upper end of said mixing conduit and the inlet end connected to said vessel desiccant inlet, the diameter of the nozzle being less than the internal diameter of the mixing conduit whereby gas flows from within the vessel into the upper open end of the mixing conduit;
    means in the lower end of the vessel to collect liquid dropout from gas within the vessel and to discharge the liquid through said liquid outlet, the co-mingled gas and liquid desiccant passing out of the vessel through said gas outlet.

2. A separator according to claim 1 including:
    filter media filling an upper portion of said vessel above said gas inlet and below the upper open end of said mixing conduit, whereby gas flowing through the vessel passes through the filter media.

3. A separator according to claim 1 including:
    means within said mixing conduit to enhance mixing of gas and liquid desiccant as they flow through the mixing conduit.

4. An absorber for contacting gas having water entrained therein with liquid desiccant comprising:
    an upright vessel having a gas inlet intermediate the top and bottom, a gas outlet adjacent the top and a liquid outlet adjacent the bottom;
    a horizontal plate separating the interior of the vessel into an upper and a lower chamber;
    a vertical gas conduit connecting at its upper end with said gas inlet and passing downwardly through an opening in said plate, the lower end terminating below said plate;
    means of introducing recycled liquid desiccant into said vessel;
    a plurality of short length vertical cylindrical members each supported in an opening in said plate, the lower end of each extending below said plate and the upper end of each extending above said plate, the lower edge of each cylindrical member being defined by a series of notches through which gas flows in passing from the vessel lower to the upper chamber;
    a cap covering the upper portion of each of said cylindrical members, the internal diameter of the caps being greater than the external diameter of the cylindrical members, the caps having passageways therein below the upper ends of the cylindrical members whereby gas flowing upwardly through said cylindrical members flows downwardly in the annular area between the exterior of the cylindrical members and the interior of the caps and out the cap passageways, said vessel liquid desiccant outlet being arranged to maintain a level of desiccant in said vessel substantially above said cap passageways, said vessel gas inlet being above the desiccant level;
    packing means within said vessel extending from said plate upwardly to a level above said desiccant level;
    a vertical discharge conduit within said vessel having an open top and bottom, the conduit being received in an opening in said plate, the bottom of the conduit terminating within said vessel lower chamber above the vessel bottom and the upper end terminating within said vessel upper chamber above said packing;
    a vertical pipe positioned within said discharge conduit of external diameter less than the internal diameter of said discharge conduit, the upper open end of the pipe being below the upper end of the discharge conduit, the discharge conduit having an opening in the sidewall thereof; and
    a horizontal pipe received in said opening in said conduit, the horizontal pipe being connected at its inner end to the lower end of said vertical pipe and the other end being connected to said vessel liquid outlet;

whereby gas entering said vessel flows downwardly in said gas conduit into said lower chamber and upwardly through said plurality of cylindrical members and out through said cap passageways, thence upwardly through said packing to said gas outlet, and excess liquid flows in the lower end of said vertical discharge conduit and into the top of said vertical pipe and thence out of said vessel.

5. An absorber according to claim 4 wherein said horizontal plate has a liquid passageway opening therein and including:

a tubular member within said vessel lower chamber, the upper end of which is attached to said plate encompassing said desiccant passageway, the lower open end terminating above the vessel bottom.

* * * * *